SEMICONDUCTOR MULTISTATE CIRCUITS
Filed June 29, 1962 2 Sheets-Sheet 1
FIG. 1
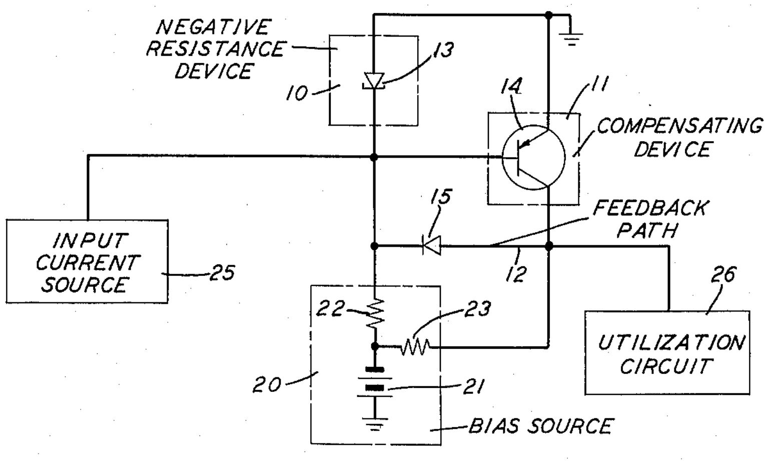
FIG. 2
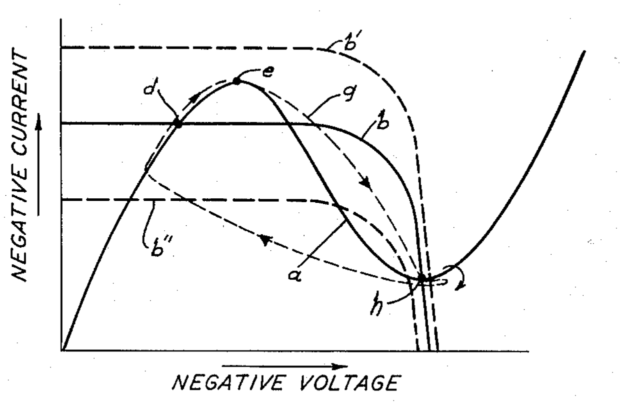
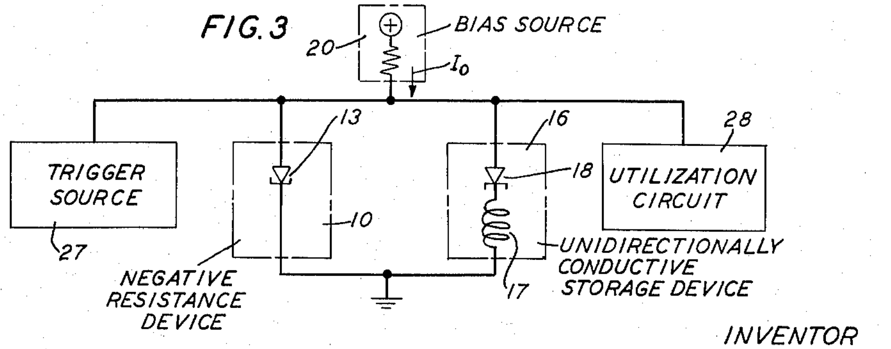
INVENTOR
C. J. N. CANDY
BY Harry C. Hart
ATTORNEY Dec. 7, 1965 C. J. N. CANDY 3,222,545

SEMICONDUCTOR MULTISTATE CIRCUITS

Filed June 29, 1962 2 Sheets-Sheet 2

INVENTOR
C. J. N. CANDY
BY Harry C. Hart
ATTORNEY 3,222,545
SEMICONDUCTOR MULTISTATE CIRCUITS Charles J. N. Candy, Newark, N.J., assignor to Bell Telephone Laboratories, Incorporated, New York, N.Y., a corporation of New York Filed June 29, 1962, Ser. No. 206,329
5 Claims. (Cl. 307—88.5)

This invention relates to multistate circuits, particularly those that respond to unipolar signals and employ a negative resistance and semiconductor devices.

A multistate circuit is characterized by plural states of equilibrium, at least one of which is stable. Upon the arrival of an input signal, the circuit switches from one state to another where it either remains momentarily or until the arrival of another input signal.

In modern technology, such as that involving digital computers, multistate circuits are required to operate at high speeds. Further, where many individual operations are to be performed, compactness is desirable. As a result, negative resistance devices have received much attention. When such a device takes the form of a diode, it exhibits the desired compactness. In addition, when the negative resistance of a diode is attributable to quantum mechanical "tunneling," as in the so-called Esaki or tunnel diode, it is able to operate at high speeds.

Unfortunately, circuits incorporating negative resistance diodes are required to meet close tolerances because of impedance considerations, and they generally provide output signals of small magnitude. Both the signal magnitudes and the circuit tolerances can be increased by employing the diodes in conjunction with compensating devices. However, where, for compactness, the compensating devices are transistors, they degrade the high-speed capability of negative resistance diodes.

Accordingly, it is an object of the invention to operate negative resistance devices in conjunction with compensating devices at high speeds. A related object is to do so when the negative resistance diodes are of the Esaki variety and the compensating devices are transistors.

Because negative resistance devices are multivalued in either current or voltage, they can be in equilibrium in one of several states. If the equilibrium state is stable, an input signal is used to switch the device to another state. When the latter state is also stable, a succeeding input signal is used to return the device to its initial state. While it is advantageous for the succeeding input signal to be of the same polarity as its predecessor, it typically must be of opposite polarity. Such is the case where a multistate circuit containing a single negative resistance diode is augmented by a compensating transistor.

Accordingly, it is a further object of the invention to render multistate circuits, employing negative resistance and compensating devices, responsive to input signals of like polarity. An associated object is to do so without impediment to the attaining of substantial switching speeds.

In accomplishing the foregoing and related objects, the invention employs a switchable storage device in conjunction with a negative resistance device. In one embodiment of the invention the switchable storage device stores charge carriers; in another embodiment, electromagnetic field energy.

According to one aspect of the invention charge carriers are stored by a switchable storage device taking the form of a compensating transistor, which, in combination with a negative resistance device, such as a diode, forms a multistate circuit. Such a circuit switches in response to unidirectional pulse signals through the use of a feedback path linking the diode with the transistor.

When the feedback path incorporates a rectifying diode, the latter serves three purposes. During the conduction interval of the transistor, the rectifying diode causes the negative resistance diode to be presented with a substantially vertical load line. This facilitates the reverse switching of the diode in response to an incoming pulse. In addition, the rectifying diode diverts current from the base of the transistor and limits carrier storage, resulting in a higher operating speed for the transistor. Finally, the rectifying diode routes reverse biasing current to the negative resistance diode during the reverse switching interval. This changes the voltage of the negative resistance diode and shifts its load line in a direction causing it to switch to its original equilibrium position.

Where the compensatng device is a transistor, the reverse biasing current is attributable to the continued conduction of the transistor after the input signal has terminated, i.e., the transit time effect. Then the switching is expedited to the extent that the input signal terminates quickly. It is a feature of the invention that a suitably abrupt termination can be provided by a monostable multistate circuit employing a negative resistance device in conjunction with a switchable energy-storage device.

A monostable multistate circuit switches to an unstable state of equilibrium in which it remains momentarily before returning to its initial state.

In keeping with another aspect of the invention, a multistate circuit is formed by a switchable storage device constituted of an auxiliary switch in a path containing a storage element for electromagnetic energy. The auxiliary switch is proportioned to be in a high-impedance condition as long as the signal level of the negative resistance device is below one of its switching thresholds, and in a low-impedance condition otherwise. As a result, the multistate circuit has positions of stable and unstable equilibrium. Below the threshold, in a region of stable equilibrium, the energy of an input signal is confined almost entirely to the negative resistance device, allowing it to rapidly attain the threshold and switch to a state of unstable equilibrium. During the return excursion of the operating locus from the unstable state of equilibrium, the low-impedance condition causes the initial stable state to be quickly attained.

Other features of the invention will become apparent after considering several of its illustrative embodiments taken in conjunction with the drawing in which:

FIG. 1 is a block and schematic diagram of a multistate circuit according to the invention;

FIG. 2 is a set of waveform diagrams explanatory of the operation of the circuit in FIG. 1;

FIG. 3 is a block and schematic diagram of a monostable multistate circuit according to the invention;

Figure 4:
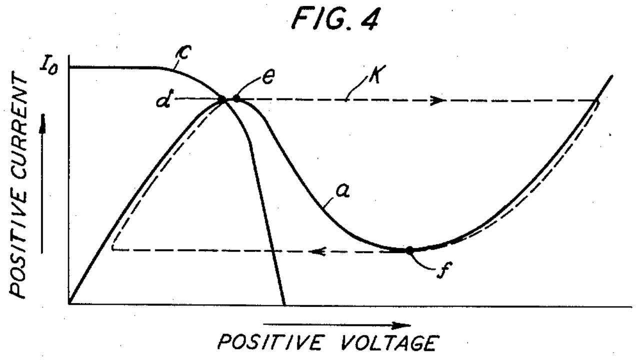
FIG. 4 is a set of waveform diagrams explanatory of the operation of the circuit in FIG. 3.

Turning to the drawings, consider the bistate circuit shown in FIG. 1. The input of a negative resistance device 10 is linked with the output of a compensating device 11 by a feedback path 12. When the negative resistance device is a gallium arsenide diode 13 and the compensating device is a silicon transistor 14, the feedback path contains a rectifying diode 15 that interconnects the collector of the transistor 14 jointly with the base of the transistor and the cathode of the negative resistance diode 13. In addition, the emitter of the transistor 14 and the anode of the diode 13 are tied in common to a point of reference potential, shown as ground.

Energy for both the transistor 14 and the negative resistance diode 13 is obtained from a bias source 20 constituted of a voltage source 21 connected to the junction point of two resistors 22 and 23. The first resistor 22 has a resistive magnitude that is sufficiently large to provide the negative resistance diode 13 with essentially a constant current. The biasing level for the transistor 14 is obtained by way of the second resistor 23.

In response to successive unipolar input signals supplied from a current source 25 at the input of the negative resistance diode 13, the voltage level appearing at an output utilization circuit 26 is caused to change from one voltage level to another for each alternate input signal. Consequently, the bistate circuit of FIG. 1 can be employed directly as a scale-of-two divider.

As shown in FIG. 2, the current-voltage characteristic *a* of the negative resistance diode employed in the bistate circuit of FIG. 1 displays low voltage and high voltage regions of positive resistance separated by an intervening region of negative resistance. The operating point of the negative resistance diode depends upon the point of intersection of its characteristic with a load curve *b*. Because of the feedback diode employed in FIG. 1, the load curve *b*, attributable to the transistor and the bias source, has two principal regions. When the transistor is nonconducting, the load is principally that of the bias source, so that the load line is essentially horizontal. But, when the transistor becomes conductive, the feedback diode serves to maintain the voltage across the negative resistance diode at a constant level, so that the load line then becomes substantially vertical.

For simplicity assume that the bistate circuit is initially at a low voltage point *d* of stable equilibrium. When a negative-polarity current pulse is applied at the input, the load line *b* is shifted upwards above the threshold *e* to a dashed-line position *b'* with the result that the negative resistance diode switches along a dashed-line locus *g* to a high voltage point *h* of stable equilibrium.

As long as the negative resistance diode 13 remains in its high-voltage state of stable equilibrium, the transistor 14 is conductive and an output is supplied to the utilization circuit 26. To return the negative resistance diode to its low-voltage state of stable equilibrium and terminate the output to the utilization circuit, an ensuing negative-polarity current pulse is applied at the input, the load line *b* is initially shifted upward, as before, and the locus moves correspondingly in the high-voltage region of positive resistance. However, upon termination of the current pulse, when the locus has returned to the high-voltage equilibrium point *h*, there is a reverse current flowing through the feedback diode 15 attributable to the transit-time effect in the transistor 14, by which the storage of charge carriers in the base region of the transistor causes continued conduction even after the input to the transistor 14 has terminated.

The feedback current acts to produce a downward displacement of the load line to a dashed-line position *b''*. As a result, in its new position the load line intersects the characteristic *a* in its negative resistance region causing the diode to switch along a dashed-line locus to its low voltage state of stable equilibrium. This completes the switching cycle and terminates the output of the transistor 14 to the utilization circuit 26. It is to be noted that exact switching locus depends upon the magnitude and the durations of the initiating signal and of the feedback current.

If it were not for the feedback diode 15, the load line *b* would not have the appreciable verticality shown in FIG. 2, so that it would be more difficult to return the diode to its low voltage equilibrium state. In addition, the feedback diode serves to prevent the accumulation of charge carriers in the base region of the transistor 14, allowing the bistable circuit to be switched rapidly. But more importantly, the feedback diode 15 provides a return path to the negative resistance diode 13 for the charges that allow the return switching to take place.

In order for the bistable circuit of FIG. 1 to operate at high switching speeds, it must be driven by input current pulses that build up rapidly and terminate abruptly after the buildup. As a first step in accomplishing this result, consider the monostable multistate circuit of FIG. 3.

The monostable circuit employs a negative resistance device 10, desirably a negative resistance diode 13 in shunt with a unidirectionally conductive storage device 16. Both are energized from the same bias source 20, providing a substantially constant current $I_0$. When the negative resistance device is a diode of the voltage-controlled type which is multivalued in current, the unidirectionally conductive device is constituted of an inductor 17 for storing electromagnetic energy in series with a so-called backward diode 18. It desirably has a characteristic such that there is an appreciable impedance in the path containing the storage element 17 until the negative resistance diode 13 reaches its threshold of switching, after which the impedance of the storage path becomes small.

Respective characteristic curves *a* and *c* for negative resistance and backward diodes 13 and 18 are shown in FIG. 4. After an input signal has been applied from a trigger source 27, the dashed-line locus *k* of operation rapidly moves to the switching threshold *e* of the negative resistance diode 13, beyond which switching takes place.

However, if it were not for the substantial impedance afforded by the backward diode 18, the energy intended for switching the negative resistance diode would instead be initially absorbed by the storage element 17, particularly at ultrahigh frequencies where the path including the diode 18 and the storage inductor 17 must have a short time constant for rapid switching. Because of the backward diode 18, the trigger energy is almost entirely taken by the negative resistance diode 13 which quickly attains its switching threshold *e* and switches to the high-voltage region of its characteristic. Once in the high-voltage region, the locus follows the resistance curve of the diode 13 to a second switching threshold *f*, at which a rapid excursion begins to the low-voltage region.

Figure 5:
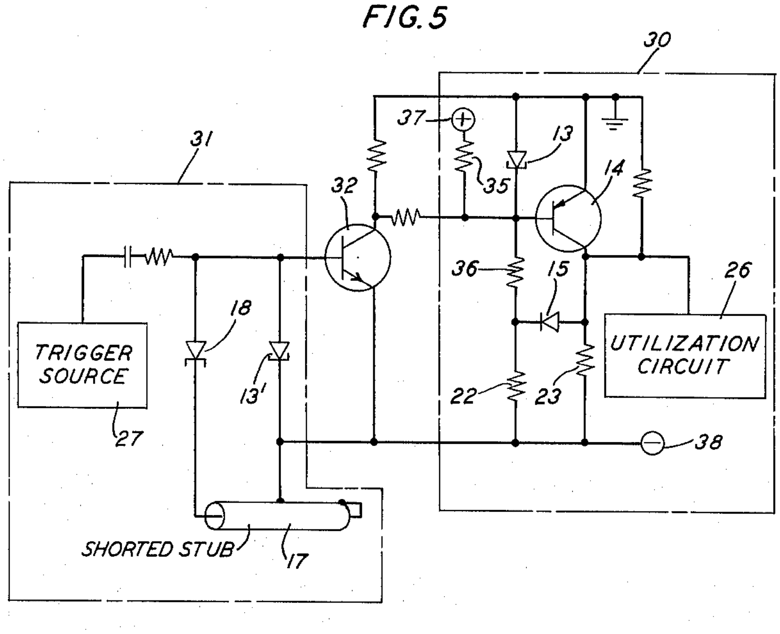
FIG. 5 is a composite multistate circuit according to the invention.

To form a triggered bistable circuit, the circuits of FIGS. 1 and 3 are combined as shown in FIG. 5 with the bistable circuit 30 coupled to the monostable trigger circuit 31 through an isolating transistor 32. For operation at frequencies as high as 150 megacycles per second, the inductor 17 in the monostable circuit 31 is desirably a shorted stub. Where the transistor 14 in the bistable circuit 30 is of germanium, a voltage divider network of two resistors 35 and 36 is employed in conjunction with two biasing sources 37 and 38.

Other adaptations of the invention will occur to those skilled in the art.

What is claimed is:

1. Apparatus which comprises
- a negative resistance diode having two terminals,
- a unidirectionally conductive diode having two terminals,
- a terminal of the negative resistance diode and a terminal of the unidirectionally conductive diode being jointly and directly connected to a common point, the other terminal of said negative resistance diode being connected directly to ground,
- and storage means interconnecting said other terminal of said negative resistance diode directly with the other terminal of said unidirectionally conductive diode.

2. Apparatus as defined in claim 1
- wherein said storage means comprises means for storing electromagnetic field energy.

3. Semiconductor apparatus which comprises
- a first path containing a negative resistance diode having an anode and a cathode,
- a second path, directly in shunt with the first, containing a backward diode having an anode and a cathode, the anodes of the diodes being connected in conmmon,
- and an energy storage element included in said second path and directly interconnecting the cathode of said negative resistance diode with the cathode of said backward diode.

4. Apparatus comprising
an input point,
a negative resistance diode having a cathode and an anode, of which the cathode is connected to said input point,
a rectifying diode having a cathode and an anode, of which the cathode is connected to said input point,
a transistor having an emitter, a collector and a base, of which the base is connected to said input point,
a common point to which the emitter of said transistor and the anode of said negative resistance diode are connected jointly,
an output point to which the collector of said transistor and the anode of said rectifying diode are connected jointly,
a first resistor having first and second terminals, of which the first is connected to the anode of said rectifying diode,
a second resistor having first and second terminals, of which the first is connected to the cathode of said rectifying diode,
and biasing means interconnecting the second terminal of said first resistor and the second terminal of said second resistor jointly with said common point.

5. Apparatus comprising
an input point,
a backward diode having a cathode and an anode, of which the anode is connected to said input point,
a first negative resistance diode having a cathode and an anode, of which the anode is connected to said input point,
storage means interconnecting the cathode of said backward diode with the cathode of said first negative resistance diode,
a first transistor having an emitter, a collector and a base, of which the base is connected to said input point and the emitter is connected to the cathode of said first negative resistant diode, a second transistor having a base connected to the collector of said first transistor, a collector constituting an output point, and an emitter,
a second negative resistance diode having a cathode and an anode, of which the cathode is connected to the base of said second transistor,
a rectifying diode having a cathode and an anode respectively connected to the base and the collector of said second transistor,
first and second means respectively interconnecting the cathode and the anode of said rectifying diode with the emitter of said first transistor,
and a common point to which are connected the collector of said first transistor, the emitter of said second transistors,
and the anode of said second negative resistance diode.

References Cited by the Examiner

UNITED STATES PATENTS

| | | | |
|---|---|---|---|
| 2,958,046 | 10/1960 | Watters | 307—88.5 X |
| 3,102,209 | 8/1963 | Pressman | 307—88.5 |
| 3,142,767 | 7/1964 | Cornish | 307—88.5 |
| 3,150,273 | 9/1964 | Dym | 307—88.5 |

FOREIGN PATENTS 558,188 6/1957 Belgium.

OTHER REFERENCES

Electronic Industries, "The Tunnel Diode as a Pulse Generator," Feb. 1961, pages 106–107.

Hoffman Electronic Corp., "Tale of the Hoffman Uni-Tunnel Diode," Oct. 1961, page 37.

1961 International Solid-State Circuits Conference, "Superregenerative Circuits Using Tunnel Diodes," Feb. 17, 1961, pages 102–103.

RCA Technical Notes, RCA TN No. 500, Sept. 1961.

Wolff, IBM Tech. Disclosure Bulletin, vol. 4, No. 2, July 1961, pages 42–43.

ARTHUR GAUSS, *Primary Examiner.*

JOHN W. HUCKERT, *Examiner.*